United States Patent
Swartz et al.

(10) Patent No.: US 9,519,135 B2
(45) Date of Patent: Dec. 13, 2016

(54) APERTURE FOR ILLUMINATING MICROMIRROR ARRAYS HAVING MIRROR TILT AXIS NOT PARALLEL WITH AN ARRAY AXIS

(71) Applicant: Palo Alto Research Center Incorporated, Palo Alto, CA (US)

(72) Inventors: Lars-Erik Swartz, Sunnyvale, CA (US); David K. Biegelsen, Portola Valley, CA (US); Patrick Y. Maeda, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 19 days.

(21) Appl. No.: 14/198,213

(22) Filed: Mar. 5, 2014

(65) Prior Publication Data
US 2015/0253566 A1    Sep. 10, 2015

(51) Int. Cl.
*G02B 26/08* (2006.01)
*G02B 5/00* (2006.01)

(52) U.S. Cl.
CPC ........... *G02B 26/0816* (2013.01); *G02B 5/005* (2013.01); *G02B 26/0833* (2013.01)

(58) Field of Classification Search
CPC .............. G02B 26/001; G02B 26/0833; G02B 26/0841; G02B 26/02; G02B 26/06; G02B 26/08; G02B 26/00; G02B 26/005; G02B 26/0808; G02B 26/0816; G02B 26/105; G02B 26/085; G02B 26/0858; G02B 26/101; B81B 3/0083; B81B 3/0086; B81B 2203/04
USPC ......... 359/198.1–199.4, 200.6–200.8, 202.1, 359/221.2, 223.1–225.1, 226.2, 904, 359/290–295,838, 846, 871, 872; 250/204, 559.06, 250/559.29, 230, 234; 347/255–260; 353/39, 353/98–99; 385/15–18, 22; 398/12, 19, 45
See application file for complete search history.

(56) References Cited

U.S. PATENT DOCUMENTS

| | | | | |
|---|---|---|---|---|
| 5,353,133 A | * | 10/1994 | Bernkopf | G03B 21/625 349/10 |
| 6,641,273 B1 | * | 11/2003 | Staker | B81B 3/0051 359/224.1 |
| 7,483,200 B1 | * | 1/2009 | Pan | G02B 26/0841 345/108 |
| 7,542,197 B2 | * | 6/2009 | Ishii | G02B 1/118 359/290 |

(Continued)

OTHER PUBLICATIONS

Title: Design and Fabrication of Vertical Light Source Array Using 45 Degree Tilted Single Crystalline Silicon Micromirrors Author: Jang, Y and Kim, Y Date: 2004 Publisher: IEEE.*

(Continued)

*Primary Examiner* — Bumsuk Won
*Assistant Examiner* — Henry Duong
(74) *Attorney, Agent, or Firm* — Fay Sharpe LLP

(57) ABSTRACT

A mirror array is positioned in relationship to a high intensity power light source to receive at least a portion of a high intensity light beam and to reflect at least a portion of the high intensity light beam. An aperture plate is positioned between the high intensity power light source and the mirror array. The aperture plate has an open area and an opaque area, the open area including a main portion and a tab portion. The main portion is located on a side of the tab portion distal from an incident light direction of the received high intensity beam of light. The open area is sized and positioned to allow rays of the high intensity beam of light to be passed through the tab portion and reflections of the passed rays of the high intensity beam of light to exit through the main portion.

22 Claims, 7 Drawing Sheets

(56) References Cited

U.S. PATENT DOCUMENTS

| | | | |
|---|---|---|---|
| 8,585,208 B2* | 11/2013 | Akiyama | G03B 21/2013 353/31 |
| 8,641,206 B2* | 2/2014 | Nakano | G03B 21/208 353/102 |
| 2003/0197176 A1 | 10/2003 | Spallas et al. | |
| 2006/0158754 A1* | 7/2006 | Tsukagoshi | G02B 26/0833 359/851 |
| 2014/0009555 A1* | 1/2014 | Itami | G02B 26/12 347/261 |

OTHER PUBLICATIONS

Title: DMD 101: Introduction to Digital Micromirror Device (DMD) Technology Author: Texas Instruments Date: Jul. 2008 Publisher: Texas Instruments.*

Title:MEMS-Based Light Valves for Ultra-High Resolution Projection Displays Publisher: Defence Research and Development Toronto (Canada) Auther: Picard, F.; Campillo, C.;Niall, Keith K.; Larouche, C.; Jerominek, H. Date: Dec. 2002.*

Kao et al., :Manufacture of Micromirror Arrays Using a CMOS-MEMS Technique, Published Aug. 6, 2009, Sensors 2009, 9, pp. 6219-6231.

Dali Explained, Aug. 5, 2003, http://www.buldings.com/article-details/articleid/1463/title/dali-explained.aspx, 5 pgs., retrieved from the Internet May 30, 2014.

Nayar et al., "Programmable Imaging Using a Digital Micromirror Array", IEEE 2004, 0-7695-2158, Apr. 2004, 8 pgs.

Jayapala, "MEMS Based Micromirror Arrays for Vision Systems and Display Applications," Apr. 2011, http://www.memsjournal.com/2011/04/mems-based-micromirror-arrays-for-vision-systems-and-display-a . . . , retrieved from the Internet May 30, 2014, 7 pgs.

* cited by examiner

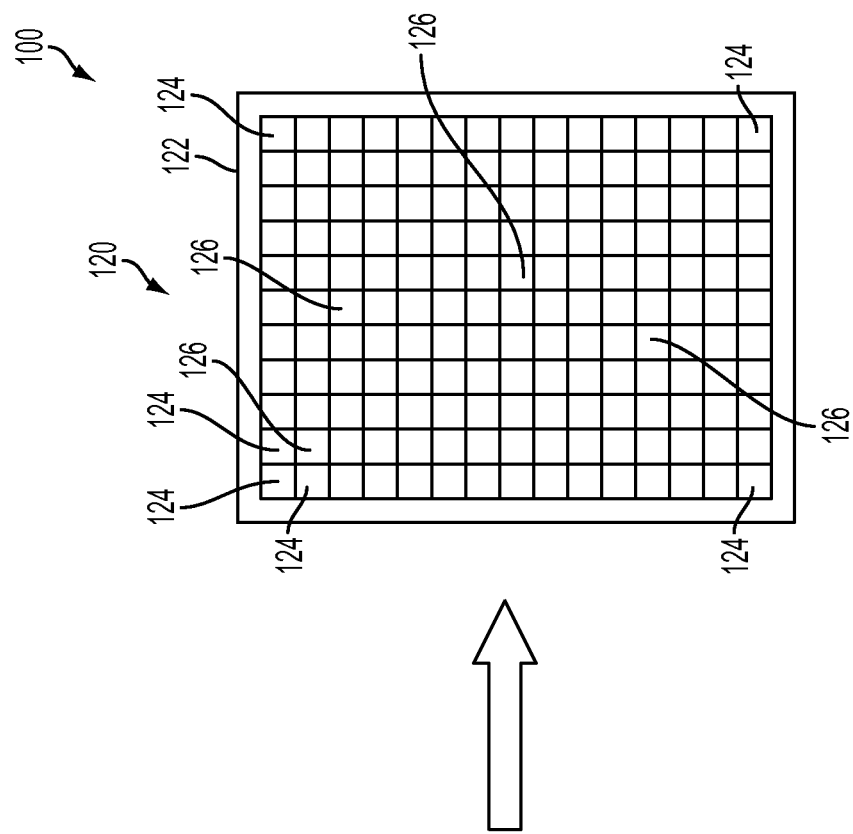
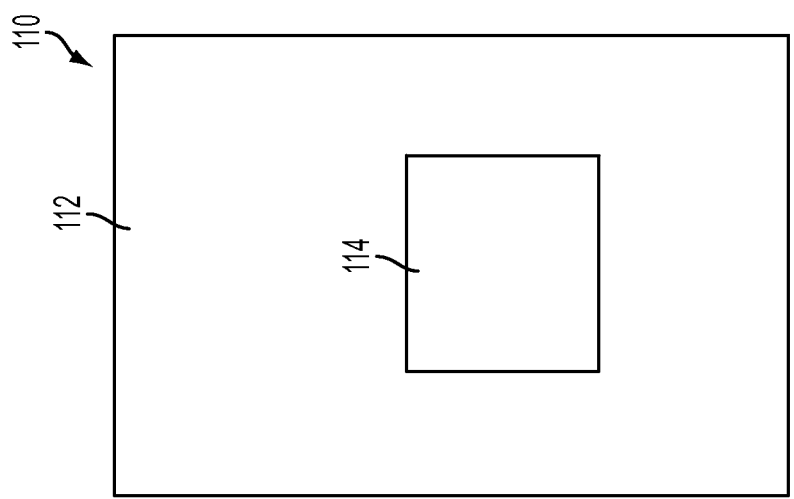
FIG. 1

APERTURE FOR ILLUMINATING MICROMIRROR ARRAYS HAVING MIRROR TILT AXIS NOT PARALLEL WITH AN ARRAY AXIS

BACKGROUND

The present application relates to image generating systems, and in particular to image generating systems which utilize mirror arrays and an aperture plate to control light that can be transmitted to the mirror arrays.

Intense illumination densities generated by high intensity power light sources are used with mirror arrays to create pixelated line and/or areal images. The area around the mirror arrays must be unilluminated to avoid device damage. Commonly, mirror arrays are laid out in rectilinear patterns, and many of these mirror arrays have the mirror tilt axis at 45° from the rectilinear axes. The incident illumination thus comes in at approximately 45° azimuthally and theta degrees away from the normal to the mirror array. An aperture plate that is positioned in front of the mirrors of the mirror array is used to eclipse or clip ends of the illumination line (which overfills the array).

The present application provides methods and systems to improve on existing aperture plates or arrangements employed within with image generating systems.

BRIEF DESCRIPTION

A generating system employs a high intensity light source for generating a high intensity beam of light, the high intensity beam of light is comprised of a plurality of individual rays of light. A mirror array of the image generating system includes a plurality of switch positionable mirrors, and a boundary region that can deleteriously scatter light and, more importantly, be damaged by the high intensity beam of light. The mirror array is positioned in relationship to the high intensity power light source to receive at least a portion of the high intensity light beam and to reflect at least a portion of the received high intensity light beam. An aperture plate is positioned between the high intensity power light source and the mirror array. The aperture plate has an open area and an opaque area, the open area including a main portion and a tab portion. The main portion is located on a side of the tab portion distal from an incident light direction of the received high intensity beam of light. The main and tab areas are sized and positioned to allow rays of the high intensity beam of light to be apertured (passed) through the tabbed portion and reflections of the apertured (passed) rays of the high intensity beam of light to exit through the main portion of the open area of the aperture plate.

In another embodiment mirror array has a mirror tilt axis non-parallel with a mirror array axis.

In another embodiment, the main portion and the tab portion are positioned to allow a maximum height (up to but no larger than the height of the mirror array) of the rectangular beam of light to be used and to eclipse (block) sides of the rectangular beam of the light.

In another embodiment, the mirror array is a micro-mirror array having a plurality of micro-mirrors.

In another embodiment, the mirror array is in a rectilinear pattern substantially aligned with the rectangular beam of light.

In another embodiment, the mirror array has a mirror tilt axis at approximately 45 degrees from the rectilinear axes, with incident illumination from the beam of light entering at approximately 45° azimuthally and theta degrees away from the normal to the mirror array, where theta is the angle of the rays from the array normal and the magnitude of theta/2 is the tilt angle of the mirrors.

In another embodiment, the tab portion is formed to eclipse ends of a rectangular line of illumination from rays of the beam of light, wherein the rectangular line of illumination overfills the width of the array.

In another embodiment, the tab portion is formed to eclipse light but still allow some reflected light to exit without being eclipsed (or blocked).

In another embodiment, the high intensity power light source is at least one laser.

In another embodiment, the high intensity power light source has a light intensity between 5 $W/mm^2$ and 100 $W/mm^2$.

In another embodiment, mirrors of the mirror array in an ON state are rotated by +12 degrees and light incident at +24 degrees is reflected and exits normal to the mirror array; for mirrors in the OFF state reflected light exits at −48 degrees from the array normal into a beam dump.

In another embodiment, the beam of light from the high intensity light source is configured to generate a rectangular illumination line, which is eclipsed or clipped by the tab portion.

In another embodiment, the aperture plate is located in a range between 1 millimeter to 50 millimeters from a front surface of the mirror array, and the tab portion is located in a range between 1 millimeter to 25 millimeters above a projected centerline of the mirror array.

In another embodiment, the main portion and the tab portion of the open area of the aperture plate are a continuous opening, with the main portion and the tab portion both in a rectangular form with the main portion sized larger than the tab portion.

In another embodiment, the aperture plate consists of a thin steel foil plated with a thermal conductor such as copper and covered by a reflecting film such as gold.

In another embodiment, provided is a method of aperturing a beam of light in an image generating system. The method includes generating a high intensity beam of light, comprised of a plurality of light rays, by use of a high intensity power light source. At least some light rays of the high intensity beam of light are received at a mirror array through an aperture plate positioned between the high intensity power light source and the mirror array. The mirror array includes a plurality of position switchable mirrors. The mirror array has a mirror tilt axis non-parallel with a mirror array axis. The aperture plate includes an open area and an opaque area, where the open area includes a main portion and a tab portion. The incident rays are all located in the tab portion of the aperture plate. At least some of the received light rays of the high intensity beam of light are reflected from the mirrors of the mirror array out of the aperture plate through the main portion. The main portion is located on a side of the tab portion distal from an incident light direction of the beam of light.

In another embodiment, the mirror array has a mirror tilt axis at approximately 45 degrees from the rectilinear axes to the array.

In another embodiment, mirrors of the mirror array in an ON state are rotated by +12 degrees and light incident at +24 degrees is reflected and exits normal to the mirror array; for mirrors in the OFF state reflected light exits at −48 degrees from the array normal into a beam dump.

In another embodiment, an aperture plate is configured for use with an image generating system which employs a high intensity power light source for generating a high intensity beam of light. The high intensity beam of light is comprised of a plurality of individual light rays. A mirror array includes a plurality of switch positionable mirrors, the mirrors of the mirror array being surrounded by a boundary region that can be damaged by a high intensity beam of light. The mirror array is positioned in relationship to the high intensity power light source to receive at least a portion of the high intensity beam of light from the high intensity light source and to reflect at least a portion of the received high intensity beam of light, wherein the aperture plate is configured to be positioned between the high intensity power light source and the mirror array. The aperture plate includes an open area including a main portion and a tab portion. The main portion is located on a side of the tab portion distal from an incident light direction of the received high intensity beam of light. The open area is sized and positioned to allow rays of the high intensity beam of light to be apertured through the tab portion and reflections of the apertured rays of the high intensity beam of light to exit through the main portion of the open area of the aperture plate. An opaque area is configured to surround the open area, wherein the entirety of the open area is within boundaries of the opaque area.

In another embodiment, the main portion and the tab portion are positioned to allow a maximum height (up to but no larger than the height of the mirror array) of the rectangular beam of light to be used and to eclipse (block) sides of the rectangular beam of the light.

BRIEF DESCRIPTION OF THE DRAWINGS

FIG. 1 illustrates an aperture and mirror array as used in the art;

DETAILED DESCRIPTION

Figure 2:
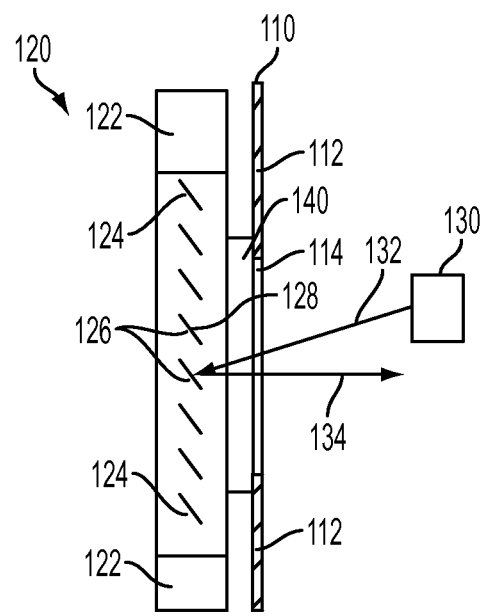
FIG. 2 is a side view of an arrangement in accordance with the present application.

The present application describes an aperture plate (and/or arrangement) configured for use in an image generating system employing a high intensity power light source and a mirror array (such as a micromirror array), having a mirror tilt axis not parallel with the mirror array axis.

FIG. 1 illustrates a pair of components 100, including an aperture plate (and/or arrangement) 110 and a mirror array 120. Aperture plate 110 includes an opaque or solid area 112 and an open or transparent area 114, positioned within opaque area 112. More particularly, the opaque area 112 is configured to surround open area 114, such that the entirety of open area 114 is within the boundary of opaque area 112. It is to be appreciated that in alternative embodiments the top and/or bottom of the open area 114 as well as the sides of the open area 114 are not all required to be surrounded by opaque area 112. The mirror array 120 includes a bounding region or area 122 defining an outer region of mirror array 120. Bounding region or area 122 is in at least one embodiment comprised of a highly light absorptive (or reflective) material and is designed to absorb (or reflect) light from non-high-intensity (or high intensity) light sources when the light overfills the mirror array.

Boundary region 122 also otherwise acts to eliminate scattered light from entering the optical path of the image generating system. It is important, in the case of intense incident illumination, to substantially eliminate intense illumination from hitting this bounding region 122.

A set of non-moving mirrors 124 in many cases define a mirror frame of mirror array 120. It is noted in the drawing, various ones of the non-moving outer frame mirrors 124 are identified. However, it is understood the frame in this embodiment consists of all of mirrors 124 immediately adjacent to the bounding region 122 as well as boundary region material contiguous with, and farther outside of bounding non-moving mirrors 124. The frame of non-moving mirrors is positioned to reflect unwanted light in an appropriate manner such as to a beam dump, as is known in the art.

Remaining mirrors are switchable (i.e., positionable) mirrors 126 that may be located to different angles dependent upon image data supplied to the mirror array 120 (as known in the art). Only a sub-set of the switchable mirrors are identified for clarity of the drawing, however, it is understood all mirrors inside the frame of non-moving mirrors 124 are considered switchable mirrors.

In one embodiment, mirror array 120 is a digital micromirror device (DMD) which generally consists of a rectangular array of mirrors each ~10 microns on a side, providing a matrix consisting of C columns by R rows. The mirrors are tilted about a rotation axis by a fixed amount, for example +/−12 degrees. For mirrors in the ON state (+12 degrees), incident light at +24 degrees is reflected and exits normal to the array. For mirrors in the OFF state the light exits at −48 degrees from the array normal into a beam dump.

Figure 3:
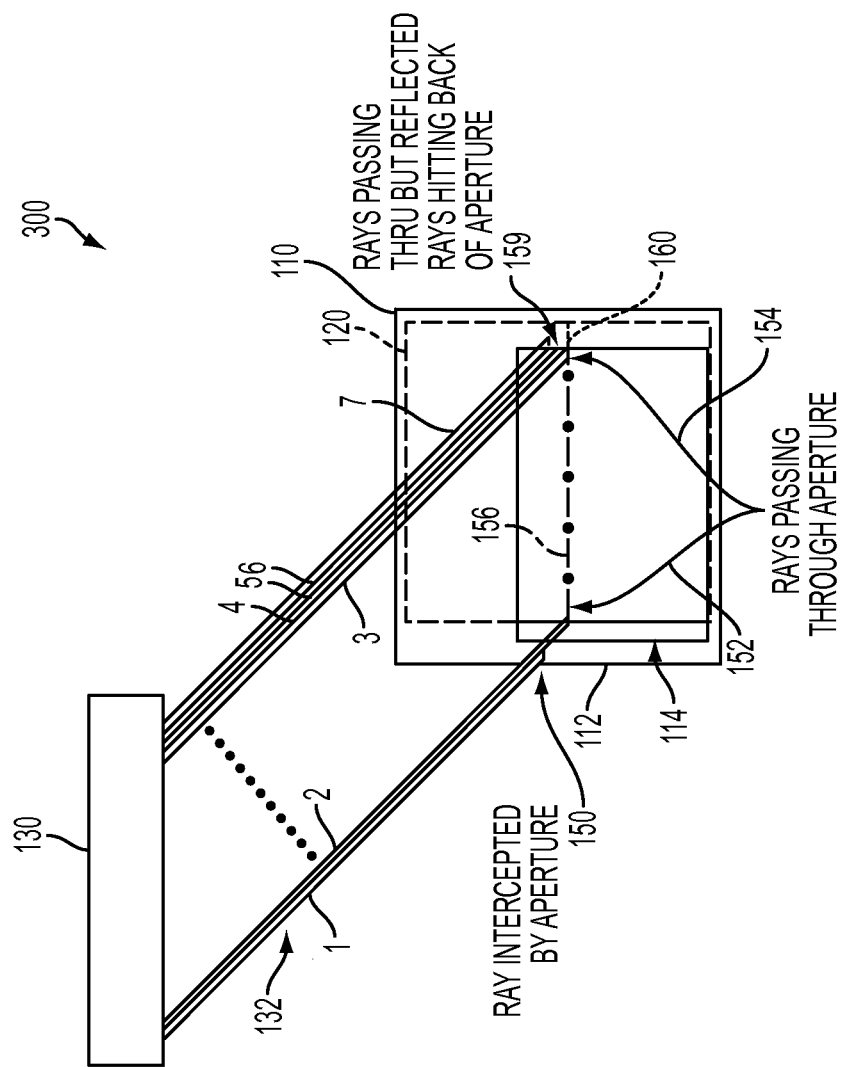
FIG. 3 is a plan view of FIG. 2.

Turning to FIGS. 2 and 3, shown is aperture plate 110 and mirror array 120 of FIG. 1, placed in operable relationship to each other. More particularly, FIG. 2 is a side view, and FIG. 3 is a plan view, showing aperture plate 110 positioned in front of mirror array 120, and further showing a high intensity power light source 130 projecting a high intensity light beam 132 towards the surface of the mirror array 120, with a reflected light 134 exiting aperture plate 110.

Returning attention to FIG. 2, similar to what was shown in FIG. 1, aperture plate 110 includes an aperture opaque area 112 and an aperture open area 114. Aperture plate 110 is shown in a modified cut-away view to emphasize the opaque and open areas. The mirror array 120 includes bounding region 122, non-switchable mirror frame 124, and switchable mirrors 126. In addition, a spacer 140 is included to ensure a specific distance between the surfaces of the aperture plate 110 in the mirror array 120. In FIG. 2, the mirrors 126 are shown positioned such that mirror surfaces 128 are facing towards aperture plate 110 (in the embodiment of FIG. 2, the mirrors are titled ~12° toward incident rays, not shown.)

Returning to FIG. 3, high intensity power light source 130 is shown to emit a light beam 132 at a 45° angle (coming from the position of a viewer into the page, from the upper part of the page towards the lower part of the page). In the following discussion, light beam 132 includes numeral designations 1, 2, 3, 4, 5, 6, 7 to represent individual rays of the light beam 132. It is, however, to be understood there may be a continuum of rays within light beam 132, and the numbering of rays 1-7 is not intended to mean the rays of light beam 132 are immediately adjacent to each other. Rather, and for example, ray 1 and ray 2 are not immediately adjacent to each other, and it is understood there is a continuum of rays in between ray 1 and ray 2. Similarly, the gap between ray 2 and ray 3 is understood to be filled with additional light rays from beam 132. However, rather than attempting to show each ray, for clarity, these ray ends are represented by the "dotted" line ("••••••••"). Therefore, rays 1-7 are identified simply to assist in describing the concepts of the present application.

For instance, illuminated image line 156 represents the rays of light from light beam 132 "painting", (e.g., impinging on) mirrors of the mirror array. Illuminated image line 156 is shown as a dash-dotted line (-•-•-•-•-).

It is noted mirror array 120 is shown primarily in dotted line, not showing each individual mirror of the array. This is done to more easily view the figure and to direct the attention to specific concepts. Therefore, it is considered the mirror array of 120 is the mirror array 120 of FIG. 1.

As also illustrated in FIG. 3, the dotted line portion of mirror array 120 at the bottom of the figure is very near but extends slightly past the bottom edge of open area 114 of aperture plate 110. Similarly, on the left-hand side, the open area 114 extends slightly past the mirror array 120. In this case, the mirror array 120 is shown as solid line, as it is viewable through the open (transparent) area 114. The remainder of mirror array 120 is shown in dotted line, as it is behind opaque area 112 of aperture plate 110.

Turning now more particularly to the description of the aperture plate 110 in connection with light beam 132 and the individual rays that have been designated as ray 1-ray 7. Ray 1 is relatively distant from aperture open area 114, and is intercepted by opaque area 112 at location 150, and therefore does not reach a mirror of the mirror array 120. Rather, it is either absorbed by the aperture opaque area 112 or reflected away from the aperture opaque area 112. Ray 2 passes past opaque area 112, and impinges on a mirror of the mirror array 120 at point 152 and is then reflected normal to the mirror array, passing out through open area 114 when the associated mirror it has reflected from is in the ON state (if the mirror is in an OFF state, the light will be passed to a beam dump).

Ray 3 also passes through aperture open area 114 (and will be the last ray of light beam 132 to pass therethrough) to a mirror of mirror array 120 (at point 154). The light ray 3 is then reflected out through the aperture opening 114. Thus, all the un-numbered light rays that exist between ray 2 through ray 3 of light beam 132 (and as mentioned above, there may be millions of such light rays) generate the reflected image line (shown as a dashed-dotted line) 156.

Next (and going out of numerical order), ray 7 is blocked or eclipsed by opaque area 112 in its attempt to enter the open area 114 and rather reflects off of the aperture plate 110 at 158 (i.e., it can be seen the end of the light ray 7 is hitting the opaque area 112 of aperture plate 110). On the other hand, light rays 4, 5 and 6 are positioned such that they are able to pass through aperture open area 114 as can be seen at point 159. However, the reflected light of rays 4, 5, 6 are intercepted by the back side of the opaque area 112 on their way out (this is illustrated by dotted line 160), and are undesirably either absorbed (causing localized heating of the aperture with the resultant distortion) or scattered/reflected back towards the array, causing either unwanted stray light or array damage.

The foregoing discussion illustrates that a simple rectangular aperture cannot achieve exactly full array width illumination and output from incident illumination which is at 45° azimuthally and theta degrees away from the normal to the mirror array, in a system with a mirror array having a mirror tilt axis at 45° from the rectilinear axes.

Figure 4:
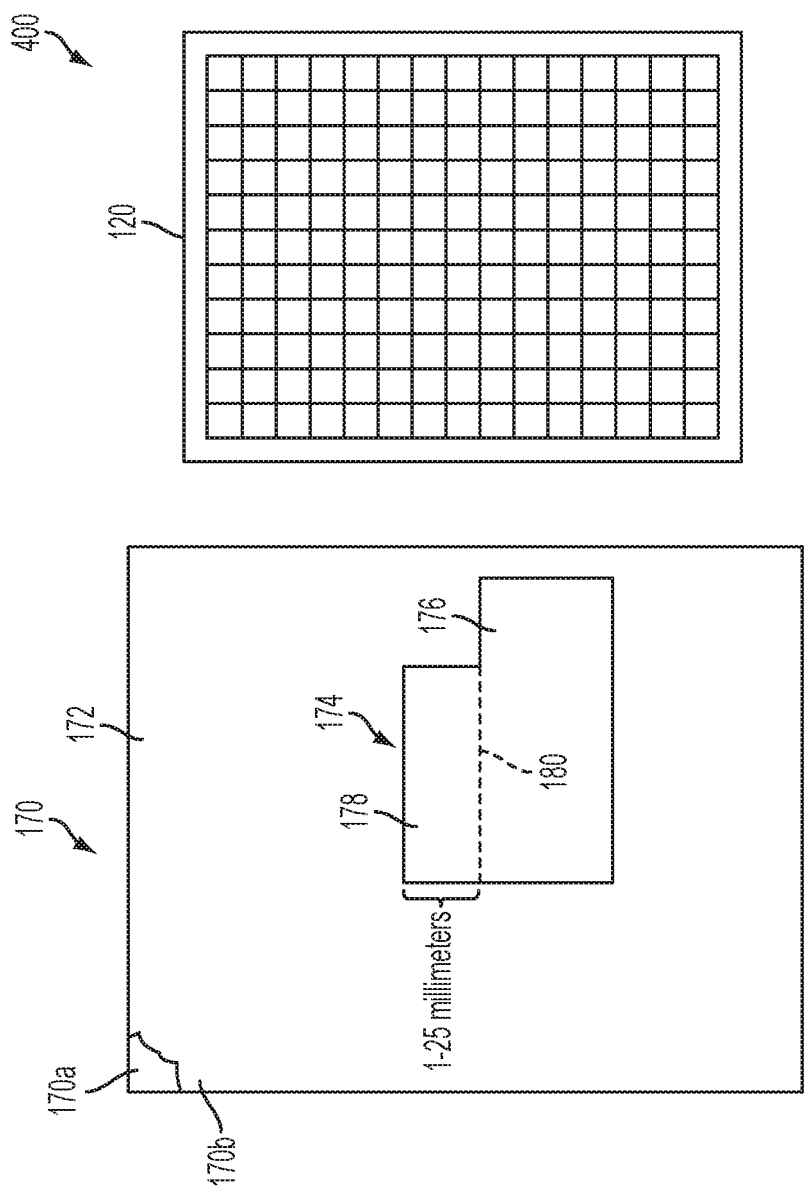
FIG. 4 illustrates an aperture in accordance with the present application, and a mirror array for which it may be used.

Turning to FIG. 4, illustrated are components 400 showing an improvement on existing aperture plates and the associated configurations within an image generating system as described above. Particularly, aperture plate 170 includes an aperture opaque area 172 and an aperture open area 174, which includes a main portion 176 and tab portion 178. As will be expanded upon herein, the light rays come into the open region 174 that is bounded by the tab portion 178 and reflected rays exit from the region bounded by the main portion 176.

The aperture plate 170 is configured to allow high thermal conductance and is highly reflective to minimize heating, particularly localized heating and thermal warping of the aperture. An example of such a structure is a thin steel shim aperture that is covered on both sides with electroplated copper 170*a* and then a thin layer of a reflecting metal such as gold 170*b*. Optical absorption is limited (by maximizing reflectance) and heat spreading is maximized (by maximizing thermal lateral conductance) so that local heating of the aperture is kept below ~10 C.

For clarity of discussion, a dotted line 180 is provided to define the boundaries between main portion 176 and tab portion 178 which define open area 174. It is to be appreciated, however, that dotted line 180 is provided only to assist in the present discussion, and the main portion 176 and tab portion 178 of open area 174 form a continuous opening. In this embodiment, the main portion 176 and tab portion 178 are both in a rectangular form with the main portion size larger than the tab portion, and the entire open area 174, is fully within the boundary of opaque area 172. Although, and as mentioned in connection with FIG. 1, it is to be appreciated that in alternative embodiments the top and/or bottom of the open area 174 as well as the sides of the open area 174 are not all required to be surrounded by opaque area 172.

The tab portion 178, in one embodiment, is located in a range between 1 millimeter and 25 millimeters above a projected centerline of the mirror array (FIG. 4). In other embodiments this range is between 5 millimeters to 20 millimeters, and the aperture plate is located in a ranger between 1 millimeter to 25 millimeters from a front surface of the mirror array (see FIG. 6).

Figure 5:
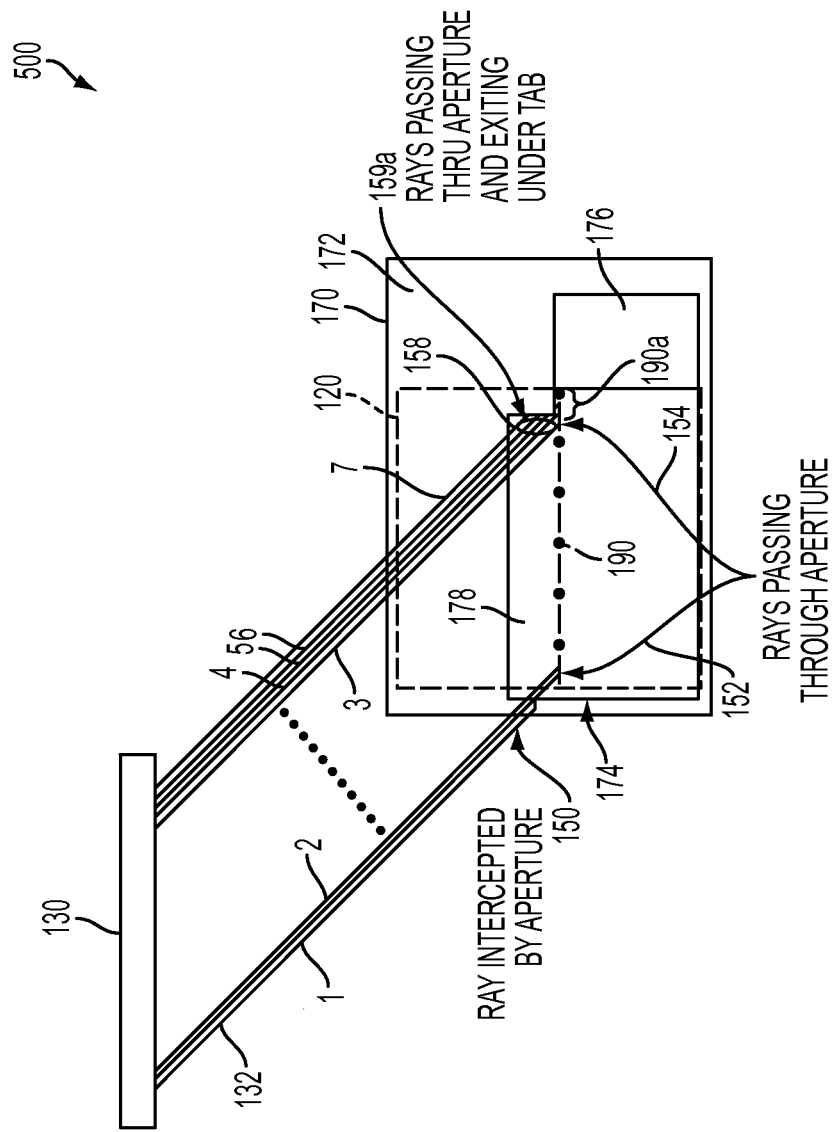
FIG. 5 is a plan view of the aperture arrangement and mirror array in accordance with the present application.

Additionally, open area 174 is designed where tab portion 178 is located on a side of the main portion 176 distal from an incident light direction of a received high intensity beam of light (or as shown in the figure above the main portion 176), generated by a high intensity power light source (as will be shown in FIG. 5). By this design, and as will be explained in greater detail below, open area 174 is sized and positioned in relationship to mirror array 120 to allow rays of the high intensity beam of light to be apertured (passed) through tab portion 178 and reflections of the apertured (passed) rays of the high intensity beam of light to exit through the main portion 176.

Turning to FIG. 5, illustrated is aperture plate 170 positioned in front of mirror array 120, which has a mirror tilt axis non-parallel with a mirror array axis. FIG. 5 also includes a high intensity power light source 130 generating a high intensity light beam 132 directed to impinge on mirror array 120, which is in a rectilinear pattern substantially aligned with the rectangular beam of light 132, which may be a rectangular beam of light. Further, in one embodiment, the high intensity light source operates in a range between 5 W/mm² to 100 W/mm²; and in another embodiment, in a range between 50 W/mm² to 300 W/mm². The mirror array 120 has a mirror tilt axis at approximately 45° from a rectilinear axis with incident illumination from the beam of light entering at approximately 45° azimuthally theta degrees away from the normal of mirror array 120, where theta is the angle of the rays from the array normal, and the magnitude of theta/2 is the tilt angle of the mirrors. The main portion and tab portion are in one embodiment positioned to allow a maximum height (up to but not larger than the height of the mirror array).

As again shown in FIG. 5, when looking at the image, the bottom side (main portion 176) of open area 174 (i.e., the side distal from the laser incidence) is cut away or otherwise manufactured to form tab portion 178. By this design, the rays passing through tab portion 178 above the level of main portion 176 arrive at mirrors of the mirror array 120 through tab portion 178 and then have the majority of their reflected rays exit normal to the mirror array 120 and pass through or out main portion 176. In the present description, therefore it is to be understood that incident rays pass only through the tab portion 178 and reflected rays exit only through the main portion 176.

More particularly, with attention to rays 1-7, rays 1 and 7 are again shown as rays of light beam 132 which are intercepted by opaque area 172 of the aperture plate 170 (see 150, 158). Ray 2 is a left limiting ray of the beam of light 132, which is just in a position to pass through tab portion 178 to impinge on the mirrors of mirror array 120 and then is reflected out through main portion 176 (see 152). Ray 3 represents a ray which is midway along a line of image illumination (e.g., 190), again being reflected out via main portion 176 (see 154). Turning to rays 4, 5 and 6, it is noted that in the aperture arrangement of FIG. 3, while these rays were able to pass through the open portion (i.e., 114 of FIG. 3) they were reflected off of the back portion of the aperture plate 110 causing undesirable heating and light interference.

In the present embodiment, rays 4, 5 and 6, pass through tab portion 178 to impinge on mirrors of the mirror array 120, but now these light rays will reflect normally from the mirror array through main portion 176 (i.e., the tab portion-main portion combination allows rays 4, 5 and 6 to no longer be intercepted on exiting along the mirror array normal).

This is confirmed by the generated line 190 (dash-dotted line) when comparing it to line 156 of FIG. 3. Particularly, as noted in FIG. 3, dashed line portion 160 represented the reflected light rays (of rays 4, 5, 6) that were intercepted by the back side of aperture plate 110 (so they did not reflect out for further processing in an image processing system). On the other hand, the "painted" or reflected line (dash and dots) 190 of FIG. 5 illustrates that the right end portion of this line (e.g., 190a) is being reflected out of the aperture opening through the main portion 176.

Figure 6:
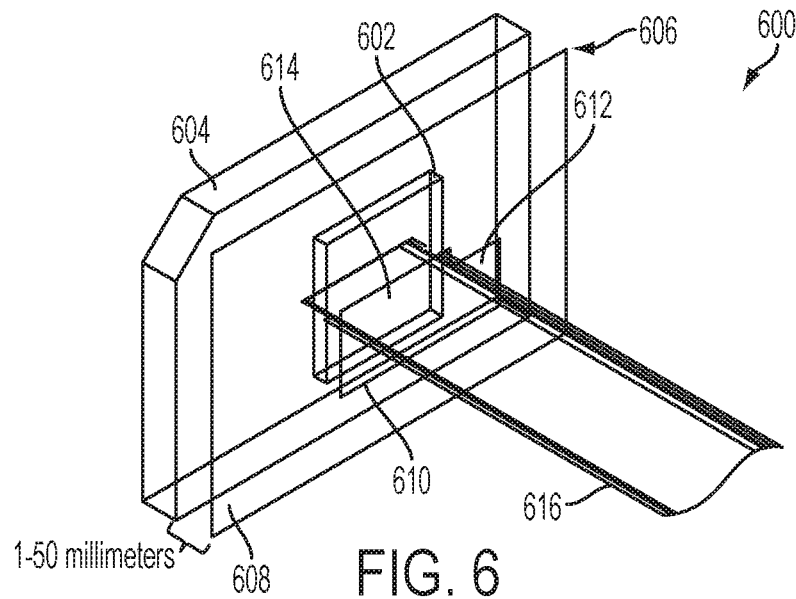
FIG. 6 depicts a mirror array and the tapped aperture of the present application viewed along direction of incidence of the light.

Turning to FIG. 6, illustrated is an arrangement 600, including a mirror array 602 and supporting/spacer structure 604, as well as an aperture plate (which may also be called a tabbed aperture plate) 606 configured in accordance with the teaching of the present application. In particular, aperture plate 606 includes an opaque area 608, and an open area 610, including a main portion 612 and tab portion 614. As in similar illustrations, the aperture plate 606 is placed in front of mirror array 602, such that a high intensity light beam 616, is required to pass through aperture plate 606 prior to impinging on mirror array 602. In the image of FIG. 6, the tabbed aperture 606 is shown as viewed from a direction along incident light beam 616. Rays of light beam 616 can see the mirror array "behind" tab portion 614 and intercept the mirror array "below" tab portion 614, and therefore be able to exit the aperture through main portion 612. It is noted the aperture main portion 612 can be arbitrarily offset beyond a distance which allows the limiting rays to exit. This extra opening permits light rays reflecting from OFF mirrors to pass through the aperture opening and be directed to a beam dump.

Figure 7:
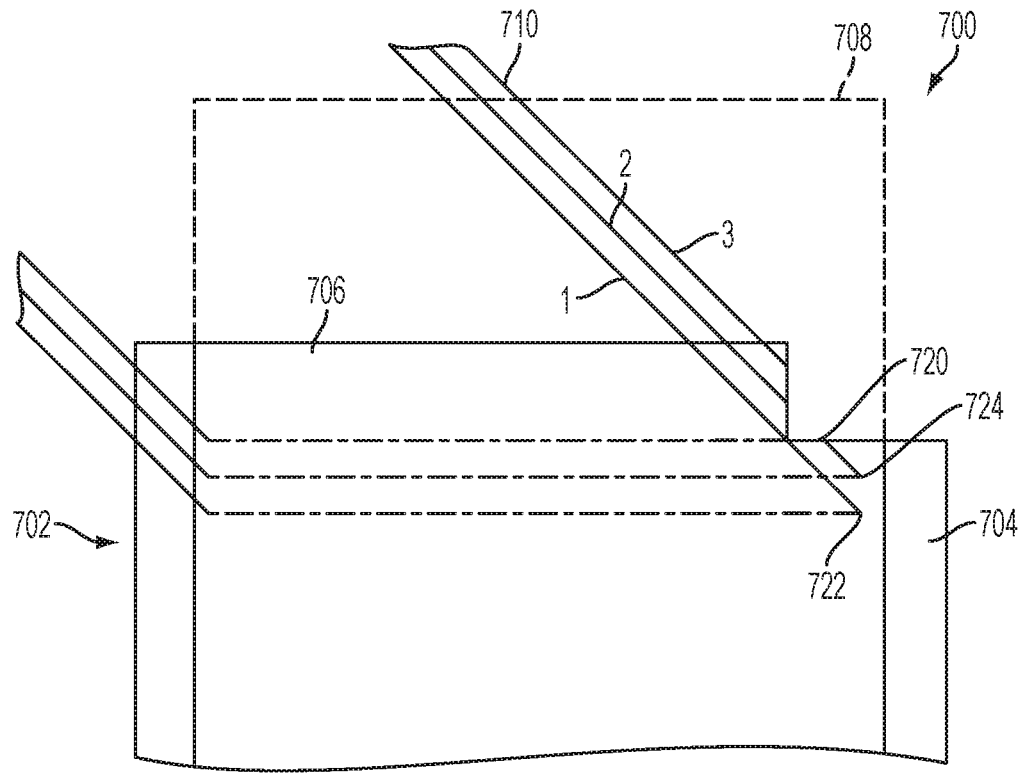
FIG. 7 shows another plan view of the tapped aperture.

FIG. 7 is a partial plan view 700 of a portion of the open area 702 (including main portion 704 and tabbed portion 706) of an aperture plate placed in front of a mirror array 708 and spaced away from the array along the viewing direction by the supporting/spacer structure as indicated by element 604 in FIG. 6, as has previously been discussed. In this figure light rays 1-3 from a high intensity light beam 710 of high intensity power light source (such as shown in the previous figure) are translated parallel to each other in the vertical direction. Ray 3 is the highest ray which passes through open area 702 and has its reflected light ray pass out just below tab portion 706 (see 720). Ray 1 is the lowest ray which can have the aperture plate work to eclipse all light to its right (see 722). Ray 2 is the ray which falls at the midpoint in height between rays 1 and 3 (see 724). This ray would typically, but not necessarily, be arranged to fall on the middle row of the mirror array. The distance between the limiting rays represents the maximum incidence beam width that can work with the tabbed aperture at this distance from the array.

Figure 8:
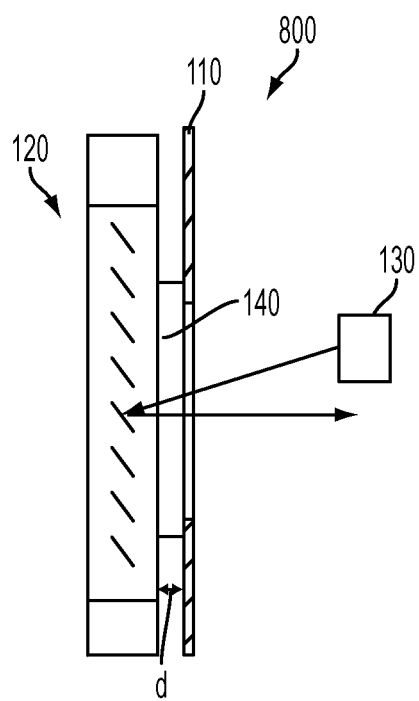
FIG. 8 depicts a side view of the micromirror and aperture array further identifying the distance between the array and aperture.

When the aperture is shifted parallel to itself along the incident ray direction and away from the mirror array by the support/spacer structure the generated swath of illumination can be increased. For a desired beam width w exiting the array, and for a tilt angle of the mirror of theta/2, the aperture is spaced away from the array by a thickness d=w*sqrt(2)/tan(theta) and the tab is translated along an array row towards the incidence direction of the illumination rays by a distance w from the last column of the array to be illuminated. As mentioned above, it is desirable to keep d (see FIG. 8) as small as possible to minimize deleterious effects of laser misalignment, but as large as needed to provide the desired illumination swath.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An imaging system including:
    a light source for generating a beam of light, the beam of light including a plurality of substantially parallel light rays;
    a mirror array including a plurality of switch positionable mirrors, the mirrors of the mirror array being surrounded by regions that can be damaged by the beam of light, the mirror array further positioned in relationship to the light source to receive at least a portion of the beam of light from the light source and to reflect at least a portion of the received beam of light; and
    an aperture plate positioned between the light source and the mirror array, the aperture plate having an open area and an opaque area, the open area including a main portion and a tab portion, the main portion located on a side of the tab portion distal from an incident light direction of the received beam of light, wherein the incident light direction is from the light source to the mirror array, the open area sized and positioned to permit rays of the beam of light to be apertured only through the tab portion and reflections of the apertured rays of the beam of light to exit only through the main portion of the open area of the aperture plate, wherein the main portion and tab portion are within a same plane.

2. The imaging system according to claim 1 wherein the mirror array has a mirror tilt axis non-parallel with a mirror array axis.

3. The imaging system of claim 1 wherein the main portion and the tab portion are positioned to allow a maximum height, up to but no larger than the height of the mirror array, of the beam of light to be used and to eclipse sides of the beam of the light, wherein the beam of light is a substantially rectangular beam of light.

4. The imaging system of claim 1 wherein the mirror array is a micro-mirror array having a plurality of micro-mirrors.

5. The imaging system according to claim 1 wherein the mirror array is in a rectilinear pattern substantially aligned with the substantially rectangular beam of light.

6. The imaging system of claim 5 wherein the mirror array has a mirror tilt axis at approximately 45° from the rectilinear axes, with incident illumination from the beam of light entering at approximately 45° azimuthally and theta degrees away from the normal to the mirror array, where theta is the angle of the rays from the array normal and the magnitude of theta/2 is the tilt angle of the mirrors.

7. The imaging system of claim 1 wherein the tab portion is formed to eclipse ends of a substantially rectangular line of illumination from rays of the beam of light, wherein the substantially rectangular line of illumination overfills a width of the array.

8. The imaging system of claim 1 wherein the tab portion is formed to eclipse light but still allow reflected light to exit the main portion without being eclipsed, and wherein the tab portion and main portion are distinct from each other and are sized differently from each other.

9. The imaging system according to claim 1 wherein the light source will have at least one laser.

10. The imaging system according to claim 1 wherein the light source has a light intensity in a range between 5 W/mm$^2$ to 100 W/mm$^2$.

11. The imaging system according to claim 1 wherein mirrors of the mirror array in an ON state are rotated by +12 degrees and light incident at +24 degrees is reflected and exits normal to the mirror array, for mirrors in the OFF state reflected light exits at −48 degrees from the array normal into a beam dump.

12. The imaging system according to claim 1 wherein the beam of light from the light source is configured to generate a substantially rectangular illumination line, which is eclipsed by the tab portion.

13. The imaging system according to claim 1 wherein the aperture plate is located in a range between 1 millimeter to 50 millimeters in front of the mirror array and the tab portion is located in a range between 1 millimeter and 25 millimeters above a projected centerline of the array.

14. The imaging system according to claim 1 wherein the main portion and the tab portion of the open area of the aperture plate are a continuous opening, with the main portion and the tab portion both in a rectangular form with the main portion sized larger than the tab portion.

15. The aperture plate of claim 1 comprised of a thin structural plate that has high thermal conductance and high optical reflectance.

16. The aperture plate of claim 15 where the plate consists of multiple layers.

17. A method of aperturing a beam of light in an imaging system, the method comprising:
generating a rectangular beam of light, including a plurality of substantially parallel light rays, by use of a light source;
receiving at least some light rays of the beam of light at a mirror array through a planar aperture plate positioned between the light source and the mirror array, the mirror array including a plurality of position switchable mirrors, and the planar aperture plate including an open area and an opaque area, wherein the open area includes a main portion and a tab portion, wherein the incident light direction is from the light source to the mirror array;
reflecting at least some of the received light rays of the beam of light from the mirrors of the mirror array out of the planar aperture plate through the open area, wherein the light rays of the beam of light are reflected out of the main portion of the open area of the aperture plate, the main portion located on a side of the tab portion distal from an incident light direction of the beam of light, and wherein the main portion and tab portion are in a positional relationship to each other and the light source wherein the incident rays pass only through the tab portion and the reflected rays only pass through the main portion.

18. The method according to claim 17 wherein the mirror array has a mirror tilt axis non-parallel with a mirror array axis and wherein at least some of the reflected rays are intercepted by a back side of the opaque area of the aperture plate.

19. The method according to claim 17 wherein the mirror array has a mirror tilt axis at approximately 45 degrees azimuthally and theta degrees away from the normal to the mirror array.

20. The method according to claim 17 wherein mirrors of the mirror array in an ON state are rotated by +12 degrees and light incident at +24 degrees is reflected light and exits normal to the mirror array, for mirrors in the OFF state reflected light exits at −48 degrees from the array normal into a beam dump.

21. An aperture plate configured for use with an image generating system which includes:
a light source for generating a beam of light, the beam of light including a plurality of substantially parallel light rays, and
a mirror array including a plurality of switch positionable mirrors, the mirror array being surrounded by regions that can be damaged by the beam of light, the mirror array positioned in relationship to the light source to receive at least a portion of the beam of light from the light source and to reflect at least a portion of the received beam of light, wherein the aperture plate is configured to be positioned between the light source and the mirror array, wherein the incident light direction is from the light source to the mirror array, the aperture plate comprising:
an open area including a main portion and a tab portion, the main portion located on a side of the tab portion distal from an incident light direction of the received beam of light, the open area sized and positioned to allow rays of the beam of light to be apertured only through the tab portion and reflections of the apertured rays of the beam of light to exit only through the main portion of the aperture plate, wherein the main portion and the tab portion are within a same plane wherein the main portion and tab portion are distinct from each other and are sized differently from each other; and an opaque area configured to surround at least a portion of the open area and positioned wherein at least some of the reflections of the apertured rays are intercepted by a back side of the opaque area of the aperture plate.

22. The imaging system of claim 21 wherein the main portion and the tab portion are positioned to allow a maximum height, up to but no larger than the entire mirror array, of the rectangular beam of light to be used and to eclipse sides of the rectangular beam of the light.

* * * * *